(12) United States Patent
Maton et al.

(10) Patent No.: US 8,344,087 B2
(45) Date of Patent: Jan. 1, 2013

(54) HYDROSILYLATION CURED ORGANOSILOXANES HAVING DILUENT THEREIN

(75) Inventors: Isabelle Maton, Braine l'alleud (BE); Giuseppina Lavinaro, Trivieres (GB); Jean Willieme, Quaregnon (BE); Tommy Detemmerman, Wezembeek-Oppem (BE); Robert Drake, Penarth (GB)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 13/246,094

(22) Filed: Sep. 27, 2011

(65) Prior Publication Data

US 2012/0016063 A1    Jan. 19, 2012

Related U.S. Application Data

(62) Division of application No. 11/910,724, filed as application No. PCT/GB2006/050073 on Apr. 3, 2006, now Pat. No. 8,067,519.

(30) Foreign Application Priority Data

Apr. 6, 2005 (GB) .................................... 0506939.8
Aug. 6, 2005 (GB) .................................... 0516239.1

(51) Int. Cl.
*C08G 77/12* (2006.01)
(52) U.S. Cl. ......................................................... 528/12
(58) Field of Classification Search .................... 528/12
See application file for complete search history.

(56) References Cited

U.S. PATENT DOCUMENTS

| | | | |
|---|---|---|---|
| 2,759,007 A | 8/1956 | Dunham, Jr. et al. |
| 2,759,008 A | 8/1956 | Dunham, Jr. et al. |
| 3,220,879 A | 11/1965 | Stare et al. |
| 3,308,203 A | 3/1967 | Metevia et al. |
| 3,341,486 A | 9/1967 | Murphy |
| 3,378,520 A | 4/1968 | Noll et al. |
| 3,419,593 A | 12/1968 | Willing |
| 3,427,270 A | 2/1969 | Northrup |
| 3,433,765 A | 3/1969 | Geipel |
| 3,480,583 A | 11/1969 | Bailey et al. |
| 3,715,334 A | 2/1973 | Karstedt |
| 3,814,730 A | 6/1974 | Karstedt |
| 3,817,894 A | 6/1974 | Butler et al. |
| 3,839,388 A | 10/1974 | Nitzsche et al. |
| 3,923,705 A | 12/1975 | Smith |
| 3,957,842 A | 5/1976 | Prokai et al. |
| 3,962,160 A | 6/1976 | Beers et al. |
| 3,971,751 A | 7/1976 | Isayama et al. |
| 4,020,044 A | 4/1977 | Crossan et al. |
| 4,022,941 A | 5/1977 | Prokai et al. |
| 4,071,498 A | 1/1978 | Frye et al. |
| 4,147,855 A | 4/1979 | Schiller et al. |
| 4,240,450 A | 12/1980 | Grollier et al. |
| 4,247,445 A | 1/1981 | Smith, Jr. et al. |
| 4,250,290 A | 2/1981 | Petersen |
| 4,312,801 A | 1/1982 | Hiriart Brodin et al. |
| 4,357,438 A | 11/1982 | Sattlegger et al. |
| 4,358,558 A | 11/1982 | Shimizu |
| 4,433,096 A | 2/1984 | Bokerman et al. |
| 4,472,563 A | 9/1984 | Chandra et al. |
| 4,486,567 A | 12/1984 | Bowman et al. |
| 4,515,834 A | 5/1985 | Fukayama et al. |
| 4,564,693 A | 1/1986 | Reiderer |
| 4,568,701 A | 2/1986 | Hopkins, Jr. |
| 4,568,707 A | 2/1986 | Voigt et al. |
| 4,599,438 A | 7/1986 | White et al. |
| 4,614,760 A | 9/1986 | Horman et al. |
| 4,624,676 A | 11/1986 | White et al. |
| 4,655,767 A | 4/1987 | Woodard et al. |
| 4,701,490 A | 10/1987 | Burkhardt et al. |
| 4,824,891 A | 4/1989 | Laurent et al. |
| 4,902,499 A | 2/1990 | Bolich, Jr. et al. |
| 4,902,575 A | 2/1990 | Yukimoto et al. |
| 4,906,707 A | 3/1990 | Yukimoto et al. |
| 4,918,121 A | 4/1990 | Peccoux et al. |
| 4,926,673 A | 5/1990 | Laurent et al. |
| 4,965,311 A | 10/1990 | Hirose et al. |
| 4,968,766 A | 11/1990 | Kendziorski |
| 4,985,476 A | 1/1991 | Endres et al. |
| 4,990,555 A | 2/1991 | Trego |
| 5,000,029 A | 3/1991 | Laurent et al. |
| 5,043,012 A | 8/1991 | Shinohara et al. |
| 5,063,270 A | 11/1991 | Yukimoto et al. |
| 5,175,325 A | 12/1992 | Brown et al. |
| 5,210,129 A | 5/1993 | de la Croi Habimana et al. |

(Continued)

FOREIGN PATENT DOCUMENTS

CN    1346384 A    4/2002

(Continued)

OTHER PUBLICATIONS

English language translation for JP 2003-252996 extracted from PAJ database on Jun. 13, 2011, 13 pages.
English language translation for JP 2000-026726 extracted from PAJ database on Jun. 13, 2011, 27 pages.
English language abstract for JP 63-083167 extracted from PAJ database on Jun. 13, 2011, 6 pages.
English language translation for JP 2000-103857 extracted from PAJ database on Jun. 13, 2011, 22 pages.
English language abstract for JP 01-152156 extracted from PAJ database on Jun. 13, 2011, 14 pages.

(Continued)

*Primary Examiner* — Kuo-Liang Peng
(74) *Attorney, Agent, or Firm* — Howard & Howard Attorneys PLLC

(57) ABSTRACT

A method of preparing a diluted chain extended organopolysiloxane containing polymer comprising the steps of reacting a pre-formed polymer with a suitable chain extender reactable with terminal groups of the polymer in the presence of a diluent material, a suitable catalyst and optionally an end-blocking agent; and Where required quenching the polymerization process wherein the diluent material is substantially retained within the resulting diluted organopolysiloxane containing polymer. The case additionally relates to products of the process and subsequent applications for the polymer such as for example sealants and rubbers.

17 Claims, No Drawings

U.S. PATENT DOCUMENTS

| | | | |
|---|---|---|---|
| 5,286,787 A | 2/1994 | Podola et al. |
| 5,300,612 A | 4/1994 | Saruyama |
| 5,350,824 A | 9/1994 | Kobayashi |
| 5,436,061 A | 7/1995 | Hannenman et al. |
| 5,534,588 A | 7/1996 | Knepper et al. |
| 5,569,750 A | 10/1996 | Knepper et al. |
| 5,863,976 A | 1/1999 | Schneider |
| 5,914,382 A | 6/1999 | Friebe et al. |
| 5,973,060 A | 10/1999 | Ozaki et al. |
| 5,981,680 A | 11/1999 | Petroff et al. |
| 6,451,440 B2 | 9/2002 | Atwood et al. |
| 6,545,104 B1 | 4/2003 | Mueller et al. |
| 6,599,633 B1 | 7/2003 | Wolf et al. |
| 6,664,323 B2 | 12/2003 | Lucas |
| 6,833,407 B1 | 12/2004 | Ahmed et al. |
| 7,056,869 B2 | 6/2006 | Guyomar et al. |
| 7,205,050 B2 | 4/2007 | Haas |
| 7,605,203 B2 | 10/2009 | Feng et al. |
| 7,754,800 B2 | 7/2010 | Maton et al. |
| 8,022,162 B2 | 9/2011 | Maton et al. |
| 8,067,519 B2 | 11/2011 | Maton et al. |
| 8,076,411 B2 | 12/2011 | Maton et al. |
| 8,084,535 B2 | 12/2011 | Maton et al. |
| 8,088,857 B2 | 1/2012 | Maton et al. |
| 8,153,724 B2 | 4/2012 | Maton et al. |
| 2002/0005344 A1 | 1/2002 | Heidlas et al. |
| 2003/0105260 A1 | 6/2003 | Cook et al. |
| 2003/0195370 A1 | 10/2003 | Taylor et al. |
| 2004/0122199 A1 | 6/2004 | Scheim et al. |
| 2005/0020754 A1 | 1/2005 | Haas |
| 2005/0054765 A1 | 3/2005 | Putzer |
| 2008/0312365 A1 | 12/2008 | Maton et al. |
| 2008/0312366 A1 | 12/2008 | Maton et al. |
| 2008/0312367 A1 | 12/2008 | Maton et al. |
| 2009/0215944 A1 | 8/2009 | Maton et al. |
| 2009/0234052 A1 | 9/2009 | Maton et al. |

FOREIGN PATENT DOCUMENTS

| | | |
|---|---|---|
| DE | 2364856 A1 | 7/1975 |
| DE | 2802170 | 1/1978 |
| DE | 2653499 | 6/1978 |
| DE | 3217516 A1 | 11/1983 |
| DE | 3342027 C1 | 5/1985 |
| DE | 3342026 A1 | 7/1985 |
| DE | 19654488 A1 | 7/1998 |
| EP | 0043501 A1 | 1/1982 |
| EP | 0093918 A1 | 11/1983 |
| EP | 0154922 | 5/1985 |
| EP | 0196565 A1 | 10/1986 |
| EP | 0215470 A1 | 3/1987 |
| EP | 0221824 A1 | 5/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0435328 A2 | 7/1991 |
| EP | 0522776 A1 | 1/1993 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1179567 | 2/2002 |
| EP | 1252252 | 10/2002 |
| EP | 1368426 | 12/2003 |
| EP | 1254192 B1 | 8/2004 |
| EP | 1481038 | 12/2004 |
| EP | 1905795 A1 | 4/2008 |
| GB | 756613 | 9/1956 |
| GB | 756614 | 9/1956 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2107726 A | 5/1983 |
| GB | 2252975 A | 8/1992 |
| GB | 2424898 A | 10/2006 |
| JP | 59100136 | 6/1984 |
| JP | 59176326 | 10/1984 |
| JP | 62253629 | 11/1987 |
| JP | 63-083167 | 4/1988 |
| JP | 01-152131 | 6/1989 |
| JP | 01-152156 | 6/1989 |
| JP | 05-178996 | 7/1993 |
| JP | 06-016813 | 1/1994 |
| JP | 9506667 | 6/1997 |
| JP | 2000-026726 | 1/2000 |
| JP | 2000-103857 | 11/2000 |
| JP | 2000-191912 | 11/2000 |
| JP | 2003-252996 | 9/2003 |
| WO | WO 9532245 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | WO 00/61672 A1 | 10/2000 |
| WO | WO 01/49774 A2 | 7/2001 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 03/080713 A1 | 10/2003 |
| WO | WO 2005/019308 A1 | 3/2005 |
| WO | WO 2005/103117 A1 | 11/2005 |
| WO | WO 2006/106362 A1 | 10/2006 |
| WO | WO 2008/045427 A1 | 4/2008 |
| WO | WO 2010/108853 A1 | 9/2010 |
| WO | WO 2010/108854 A1 | 9/2010 |

OTHER PUBLICATIONS

English language translation for JP 05-178996 extracted from PAJ database on Jun. 13, 2011, 17 pages.
English language abstract for JP 9506667 extracted from espacenet.com database on Jun. 13, 2011, 31 pages.
English language abstract for JP 01-152131 extracted from PAJ database on Jun. 13, 2011, 7 pages.
English language translation for JP 06-016813 extracted from PAJ database on Jun. 13, 2011, 13 pages.
PCT International Search Report for PCT/EP2010/053569, dated May 21, 2010, 4 pages.
English language abstract for DE 19654488 extracted from the espacenet.com database on Mar. 14, 2012, 7 pages.
PCT International Search Report for PCT/EP2010/053567, dated Jun. 2, 2010, 3 pages.
English language abstract for EP 0221824 extracted from the espacenet.com database on Mar. 14, 2012, 17 pages.
English language abstract not available for JP 59176326; however, see English language equivalent US 4,433,096. Original document extracted from the espacenet.com database on Mar. 19, 2012, 13 pages.
Chenghong Li: "Preparation of Nitrile Containing Siloxane Triblock Copolymers and their Application as Stabilizers for Siloxane Magnetic Fluids (Thesis)" 1996, pp. 22-27.
Mingotaud et al., "Cationic and anionic ring-opening polymerization in supercritical CO2", Macromol. Symp. 153, 77-86 (2000).
Mingotaud et al., "Cationic and Anionic Ring-Opening Polymerization in Supercritical CO2, Preliminary Results", Polymer Journal, vol. 31, No. 5, pp. 406-410 (1999).
English language abstract for CN 1346384 extracted from espacenet.com database, dated Jul. 16, 2010, 22 pages.

English language abstract for DE 3217516 extracted from espacenet.com database dated Jul. 15, 2008.
English language abstract for DE 3342026 extracted from espacenet.com database dated Jul. 15, 2008.
English language abstract for DE 3342027 extracted from espacenet.com database dated Jul. 15, 2008.
English language abstract for EP 0043501 extracted from delphion.com database dated Jul. 22, 2008.
English language abstract for EP 0093918 extracted from espacenet.com database dated Jul. 18, 2008.
English language abstract for EP 0215470 extracted from delphion.com database dated Jul. 22, 2008.
English language abstract for EP 0801101 extracted from espacenet.com database dated Jul. 15, 2008.
English language abstract for EP 0807667 extracted from espacenet.com database dated Jul. 15, 2008.
English language abstract for EP 0885921 extracted from espacenet.com database dated Jul. 18, 2008.
Article: Kirk-Othmer, "Silicone Compounds", Encycolpedia of Chemical Technology, 4th edition, vol. #22, 1997, pp. 107-109.
PCT International Search Report for PCT/GB2006/050075, dated Jul. 28, 2006, 4 pages.
PCT International Search Report for PCT/GB2006/050074, dated Aug. 2, 2006, 4 pages.
PCT International Search Report for PCT/GB2006/050072, dated Jul. 21, 2006, 4 pages.
PCT International Search Report for PCT/GB2006/050073, dated Aug. 2, 2006, 5 pages.
PCT International Search Report for PCT/EP2006/061285, dated Jul. 28, 2006, 4 pages.
PCT International Search Report for PCT/US2006/011986, dated Aug. 2, 2006, 3 pages.
English language translation for JP 2000-191912 extracted from PAJ database on Nov. 3, 2011, 156 pages.
Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.
Aart Molenberg et al., A Fast Catalyst System for the Ring-Opening Polymerization of Cyclosiloxanes, Macromol, Rapid Commun. 16, 449-453 (1995), 5 pages.
Reinhard Schwesinger, Extremely Strong, Uncharged Auxiliary Bases; Monomeric and Polymer-Supported Polyaminophosphazenes (P2-P5), 1996, 27 pages.
A.W. Karlin et al., Uber Syntheseverfahren von Siloxanelastomeren, 5 pages, (1966).
Mark E. Van Dyke, et al., Reaction Kinetics for the Anionic Ring-Opening Polymerization of Tetraphenyletramethylcyclo-Tetrasiloxane Using a Fast Catalyst System, 2 pages.
English language abstract not available for JP 62253629; however, see English language equivalent US 4824891. Original document extracted from the espacenet.com database on Mar. 19, 2012, 15 pages.

US 8,344,087 B2

HYDROSILYLATION CURED ORGANOSILOXANES HAVING DILUENT THEREIN

RELATED APPLICATIONS

This application is a divisional of U.S. patent application Ser. No. 11/910,724, filed May 22, 2008, which claims priority to and all the advantages of International Patent Application No. PCT/GB2006/050073, filed on Apr. 3, 2006, which claims priority to Great Britain Patent Application Nos. GB 0506939.8 and GB 0516239.1, filed on Apr. 6, 2005 and Aug. 6, 2005 respectively, all of which are expressly incorporated herein by reference.

This invention is concerned with the chain extension of one or more polymers or oligomers, comprising an at least partially organopolysiloxane containing polymeric chain, in the presence of a diluent to produce a diluted polymer and compositions containing the resulting polymers.

The rheological properties of uncured polymers are primarily a function of their viscosities. The viscosity of an uncured polymer is directly related to the molecular weight of the polymer and the length of the polymer chain, usually defined as the degree of polymerisation (dp). In general the lower the viscosity of a polymer the higher the extrusion rate of uncured compositions which contain the polymer. The viscosity of the uncured polymer is also a major influence on several of the physical properties of compositions incorporating the polymer such as, for example, sealant compositions, when such compositions are subsequently cured.

Organosiloxane compositions which cure to elastomeric solids are well known and such compositions can be produced to cure at either room temperature in the presence of moisture or with application of heat. Typically those compositions which cure at room temperature in the presence of moisture are obtained by mixing a polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing under room conditions.

One important application of the above-described curable compositions is their use as sealants. In use as a sealant, it is important that the composition has a blend of properties which render it capable of being applied as a paste to a joint between substrate surfaces where it can be worked, prior to curing, to provide a smooth surfaced mass which will remain in its allotted position until it has cured in to an elastomeric body adherent to the adjacent substrate surfaces. Typically sealant compositions are designed to cure quickly enough to provide a sound seal within several hours but at a speed enabling the applied material to be tooled in to a desired configuration shortly after application. The resulting cured sealant is generally formulated to have a strength and elasticity appropriate for the particular joint concerned.

The introduction of an inorganic filler into an elastomeric composition containing an organopolysiloxane containing polymer is often required to obtain useful tear, durometer, elongation and modulus at 100% elongation properties. The rheological properties of an uncured elastomer are dependent on filler properties (when a filler is present in the composition) such as filler concentration and structure and the degree of polymer-filler interaction as well as the viscosity of the polymer. In general the lower viscosity of the uncured organopolysiloxane containing composition, optionally containing filler, the higher the extrusion rate of the uncured composition. As a result applications requiring high extrusion rates such as uncured sealants, which in use, are generally extruded manually using a sealant gun or the like, need to typically use low viscosity polymers (e.g. <100 000 mPa·s at 25° C.) to ensure suitable composition extrusion rates for manual end uses.

The physical properties of the resulting cured composition effected include elongation and modulus (at 100% elongation) which are particularly important for sealants used in for example expansion joints in the construction and transportation industries, where the need for sealants with low modulus and high elongation are essential.

Hence, whilst it is known that increasing the molecular weight of a polymer would improve some physical properties of a sealant, typically the maximum viscosity used in current formulations are in practice no greater than about 150 000 mPa·s at 25° C. Whilst organopolysiloxane polymers having viscosities of up to 1,000,000 mPa·s at 25° C. have been discussed in the prior art the use of such polymers having such viscosities has been practically and economically unmanageable. Hence, whilst it is known that increasing the molecular weight of the polymer would improve the some properties of the sealant typically the maximum viscosity used in current formulations are in practice no greater than about 150 000 mPa·s at 25° C.

One method used to increase polymer chain lengths is "chain extension" in which after the completion of an initial polymerisation reaction, difunctional intermediates reactive with the polymer end-groups are added to the resulting polymer with a view to further increasing the dp and molecular weight of the polymer. In sealant applications the chain extender molecules may be reacted with polymer at the same time as the composition is cured by interaction with a cross-linker necessitating careful selection of chain extender such that the rate of reaction between polymer and chain extender is faster than the reaction between the polymer and cross-linker. In the case of sealant type applications this has the advantage of keeping the viscosity of uncured compositions at a level suitable for manual application of the composition using a sealant gun or the like, and that an effective dp and molecular weight increase occurs during the curing stage after the sealant composition has been applied and introduced into air.

Suitable chain extenders are identified as being reactable with the polymer end groups to generate extended polymers. Typically whilst this may involve any suitable chemistry, the chain extension of polymers of this type usually involves one of two reaction routes, i.e. addition and condensation chain extension.

In U.S. Pat. No. 3,341,486 Silanol end-blocked polysiloxanes are combined with di- and triaminoxysilanes or -siloxanes to provide a room temperature vulcanisable (RTV) composition that both chain extends and cross-links in the presence of atmospheric moisture. In U.S. Pat. No. 4,071,498 a siloxane containing monovalent hydrocarbon or halogenated hydrocarbon residues and, on average, at least one —OH group. per molecule bonded to Si is mixed with methylvinyldi(epsilon-caprolactamo)silane. The resulting organosiloxane isolated had a higher molecular weight than the original organosiloxane and contains methylvinylsiloxane units. U.S. Pat. No. 4,614,760 describes a one-part silicone elastomeric composition that is flowable or easily extruded is prepared by mixing a hydroxyl end-blocked polydiorganosiloxane, a difunctional silane having two amido radicals, and an organic peroxide suitable for vulcanizing silicone rubber. Upon application the composition is exposed to moisture to activate a chain extension reaction. U.S. Pat. No. 5,914,382 describes a method of chain extending α,Ω-dihydroxypoly (diorganosiloxanes) comprises reacting low molecular weight α,Ω-dihydroxypoly(diorganosiloxanes) with phosphate ester(s) and/or $H_3PO_4$. EP0909778 describes the preparation of chain-extended organopolysiloxanes from organopolysiloxanes having at least one silicon-bonded hydroxyl group per polymer molecule, by adding a nitrogen-containing silylating agent which is capable of both chain-extending and silylating the organopolysiloxanes with a nitrogen-containing silylating agent capable of chain-extension to produce a chain-extended organopolysiloxane. US2004/0122199 describes organopolysiloxane compositions comprising organopolysiloxanes which are terminated at both ends by Si-bonded hydroxy groups, at least one dialkylaminomethylalkyldialkoxysilane chain extender and/or partial hydrolysates thereof, (d) at least one isocyanurate deactivator, and optionally plasticiser, a silane cross-linker and/or one or more catalysts for accelerating the reaction of the silane crosslinker with Si—OH groups on the polymer. EP0651022 describes a curable organosiloxane composition comprising an organopolysiloxane polymer having vinyl end-groups a chain extender containing a silane or short chain siloxane having two Si—H groups, a cross-linking agent and a platinum based catalyst.

It has become common practice in the formulation of silicone based compositions used as room temperature cure sealants, to include additives which serve to "extend" and/or "plasticise" the silicone sealant composition by blending the or each extending compound (henceforth referred to as an "processing aid") and/or plasticising compound (henceforth referred to as a "plasticiser") with the pre-prepared polymer and other ingredients of the composition.

A processing aid (sometimes also referred to as an extender or secondary plasticiser) is used to dilute the sealant composition and basically make the sealant more economically competitive without substantially negatively affecting the properties of the sealant formulation. The introduction of one or more processing aids into a silicone sealant composition not only reduces the overall cost of the product but can also affect the properties of resulting uncured and/or cured silicone sealants. The addition of processing aids can, to a degree, positively effect the rheology, adhesion and clarity properties of a silicone sealant and can cause an increase in elongation at break and a reduction in hardness of the cured product both of which can significantly enhance the lifetime of the cured sealant provided the processing aid is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than processing aids and are typically introduced into the polymer composition in the form of liquids or low melting point solids (which become miscible liquids during processing. Typically, for silicone based composition plasticisers are unreactive short chain siloxanes such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

Processing aids need to be both sufficiently compatible with the remainder of the composition and as non-volatile as possible at the temperature at which the resulting cured sealant is to be maintained (e.g. room temperature). However it has been found that whilst some proposed processing aids are effective during storage, at the time of application of the sealant and at least for a time thereafter, there are several well known problems regarding their use. These include:—

(i) UV stability—the discolouring of cured sealants containing processing aids upon prolonged exposure to UV light;

(ii) Poor compatibility with the polymer composition (e.g. a sealant composition) leading to their exuding from the sealant over time which negatively effects the physical and aesthetic properties and lifetime of the cured product e.g. sealant; and (iii) Staining of the surrounding substrates onto which the processing aids exude from the composition.

The process used in the industry, for introducing processing aids and/or plasticisers into a polymer composition such as a sealant composition, consists of merely mixing all the pre-prepared ingredients, e.g. polymer, cross-linker, catalyst, filler and the or each processing aid and/or plasticiser together in appropriate amounts and orders of addition. Compatibility of organic processing aids and/or plasticisers with the other ingredients in a silicone based polymer composition, is a significantly greater problem than with respect to organic based polymers, silicone polymers into which the processing aids and/or plasticisers are introduced tend to be highly viscous polymers, and the chemical nature of the polymer being silicone based as opposed to organic based can have significant effects on the compatibility. The level of compatibility effectively determines the amount of processing aid and/or plasticiser which can be introduced into a polymer composition. Typically this results in the introduction of significantly lower amounts of, in particular, processing aids into the composition than may be desired because the processing aid will not physically mix into the polymer composition sufficiently well, particularly with the pre-formed polymer which is usually the largest component, other than the filler, in the composition. The problem of compatibility of plasticisers and processing aids in silicone polymer compositions has been known in the industry ever since the introduction of organic processing aids, which as far the inventors are aware, until the present invention has not been addressed other than by the proposal of an ever increasing number of organic based processing aids, each of which is physically unable to be mixed into the sealant composition at amounts of about 30% by weight of the total amount of processing aid and polymer.

Historically, unreactive siloxanes such as trialkylsilyl terminated polydiorganosiloxanes (for example trimethylsilyl terminated polydimethyl siloxane (PDMS)) were originally used as processing aids and/or plasticisers in silicone based sealants because they were chemically similar and had excellent compatibility.

A wide variety of organic compounds and compositions have been proposed for use as processing aids for reducing the cost of the silicone sealant compositions. These materials are generally classified into two groups as high volatility processing aids and low volatility processing aids.

Compositions containing high volatility processing aids may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility processing aids (sometimes referred to as higher molecular weight processing aids), are chosen with the intention of having good compatibility with the polymers in the sealant compositions. The resulting sealants are termed "extended sealants" and generally show much more acceptable properties than diluted sealants. These lower molecular weight processing aids can completely or partially replace the PDMS plasticizer in the formulation.

Low molecular weight polyisobutylenes (PIB) are proposed as processing aids in DE 2364856 and DE 3217516, however, due to the limited compatibility, the maximum amount of PIB processing aid that can be added to an acetoxy silicone sealant formulation is typically in the 25-30% (by weight) range. A higher addition level causes the processing aid to bleed to the surface and makes the cured sealant surface sticky. Phosphate esters are described as potential processing aids in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as processing aids. These and other organic compounds and mixtures proposed as processing aid materials for silicone sealant compositions are described in the following publications:—

GB2041955 describes the use of dodecyl benzene and other alkylarenes as organic processing aids. GB2012789 describes the use of trioctyl phosphate for the partial replacement of PDMS. DE3342026 and DE3342027 describe the use of esters of aliphatic monocarboxylic acids as processing aids. EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight >180) in combination with one or more alkyl aromatic compounds. EP0842974 describes the use of alkylcyclohexanes (molecular weight >220). WO99/66012 and WO 00/27910 describe oil resistant silicone compositions containing one or more aliphatic liquid polymers and oils, petroleum derived organic oils, alkyl phosphates, polyalkylene glycol, poly (propylene oxides), hydroxyethylated alkyl phenol, dialkyldithiophosphonate, poly (isobutylenes), poly (a-olefins) and mixtures thereof as processing aids.

In recent years the industry has increasingly used paraffinic hydrocarbons as processing aids. EP0885921 describes the use of paraffinic hydrocarbon mixtures containing 60 to 80% paraffinic and 20 to 40% naphthenic and a maximum of 1% aromatic carbon atoms. EP 0807667 appears to describe a similar processing aid comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticisers. EP1481038 describes the use of a hydrocarbon fluid containing more than 60 wt. % naphthenics, at least 20 wt. % polycyclic naphthenics and an ASTM D-86 boiling point of from 235 to 400° C. EP1252252 describes the use of an processing aid comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "processing aid" which preferably contains greater than 40% by weight of cyclic paraffins.

As mentioned above a fundamental problem with the use of extending materials is their lack of compatibility with components in the uncured silicone sealant composition typically resulting in phase separation during storage and exudation from the cured sealant over the complete temperature range of interest. It is commonly found that, after curing, sealants containing processing aids and/or plasticisers may exude said processing aids and/or plasticisers resulting in a significant reduction in the lifetime of the cured sealant, a feature particularly prevalent with processing aids having low boiling points, e.g. <100° C. Whilst it is in the interest of the manufacturer to incorporate a high loading of processing aid into their sealant compositions, the physical mixing of the processing aid material with the other ingredients as advocated in all of the above documents is prevented through the lack of compatibility particularly with respect to high viscosity polymers where the viscous properties of the polymer component are a physical barrier to the incorporation of large volumes of processing aid into the sealant compositions. It is generally found therefore that the amount of processing aid, which may be incorporated into the sealant composition, is typically between 20 and 40% by weight dependent on the processing aid or combination of processing aids used.

Whilst many of the organic processing aids proposed above have potential they all generally have problems for example whilst alkylbenzene processing aids have a seemingly suitable combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing). However, when exposed to artificial or natural weathering, alkyl benzene extended sealants tend to yellow rather rapidly. After prolonged weathering, these extended sealants continue to yellow, and also lose their transparency. This problem does not occur with other processing aids, such as phosphate esters or polyisobutylene.

Furthermore, whilst the use of polymers with very high degrees of polymerisation in siloxane formulations, can result in several advantageous properties such as high elasticity the viscosity of such polymers is generally so great (i.e. silicone gums) that they become either completely unmanageable with respect to inter-mixing with other ingredients, such as fillers, cross-linkers, processing aids and/or plasticisers, or require very high shear mixers which are expensive to operate. There has therefore been a long-felt need within the industry to develop a process for the ease of introduction of silicone based polymers of very high degrees of polymerisation into compositions whilst avoiding the need for high cost equipment.

The inventors have now surprisingly developed a new process for the chain extension of a polymer comprising an at least partially organopolysiloxane containing backbone involving the incorporation of diluents comprising processing aids and/or plasticisers in the preparation of polymers by chain extension whilst avoiding compounding problems usually encountered with polymers of such viscosities. Such diluted polymers resulting from the above may provide products comprising such polymers with new and advantageous properties in comparison with prior art materials.

In accordance with the present invention there is provided a method of making a diluted chain extended organopolysiloxane containing polymer comprising the steps of:—
(a) reacting a pre-formed polymer with a chain extender reactable with terminal groups of the polymer, said chain extender being selected from the group of
  (i) a Diacetamidosilane, a diacetoxysilane, a dichlorosilane, a diaminosilane where each amino group has one or two N—H bonds per nitrogen; a dialkoxysilane, a diamidosilane, a hexaorganodisilazane, a diketoximinosilane;
  (ii) a polydialkylsiloxane having a degree of polymerisation of from 2 to 25 and having at least two acetamido or acetoxy or amino or alkoxy or amido or ketoximo substituents per molecule,
  (iii) an α-aminoalkyldialkoxyalkylsilane wherein the alkyl and alkoxy groups contain from 1 to 6 carbon atoms,
  (iv) a compound of the structure $ZMe_2SiO(Me_2SiO)_y SiMe_2Z$ or $ZMe_2Si-Y-SiMe_2Z$ where Z is a heterocyclic Si—N group Y is a divalent hydrocarbon radical selected from the group consisting of —$(CR_2)_m$- or —$C_6H_4$—, y is 0 or a whole number, and m is 2 to 6 inclusive and R is a monovalent hydrocarbon group;
  (v) a dialkenylsilane, a dihydrosilane,
  (vi) a polydialkylsiloxane having a degree of polymerisation of from 2 to 25 and at least one Si-alkenyl bond per terminal group,
  (vii) a polydialkylsiloxane having a degree of polymerisation of from 2 to 25 and at least one Si—H bond per terminal group;
in the presence of a diluent material, a suitable catalyst and optionally an end-blocking agent; and
(b) where required quenching the chain extension process;
  wherein the diluent material is substantially retained within the resulting diluted organopolysiloxane containing polymer.

In accordance with the present invention there is provided a diluted chain extended organopolysiloxane containing polymer obtainable by a method comprising the steps of:—
(a) reacting a pre-formed organopolysiloxane containing polymer with a chain extender reactable with terminal groups of said polymer, said chain extender being selected from the group of
  (i) a Diacetamidosilane, a diacetoxysilane, a diaminosilane where each amino group has one or two N—H bonds per nitrogen; a dialkoxysilane, a diamidosilane, a hexaorganodisilazane, a diketoximinosilane;
  (ii) a polydialkylsiloxane having a degree of polymerisation of from 2 to 25 and having at least two acetamido or acetoxy or amino or alkoxy or amido or ketoximo substituents per molecule,
  (iii) an α-aminoalkyldialkoxyalkylsilane wherein the alkyl and alkoxy groups contain from 1 to 6 carbon atoms,
  (iv) a compound of the structure $ZMe_2SiO(Me_2SiO)_y SiMe_2Z$ or $ZMe_2Si-Y-SiMe_2Z$ where Z is a heterocyclic Si—N group Y is a divalent hydrocarbon radical selected from the group consisting of —$(CR_2)_m$- or —$C_6H_4$—, y is 0 or a whole number, and m is 2 to 6 inclusive and R is a monovalent hydrocarbon group;
  (v) a dialkenylsilane, a dihydrosilane,
  (vi) a polydialkylsiloxane having a degree of polymerisation of from 2 to 25 and at least one Si-alkenyl bond per terminal group;
  (vii) a polydialkylsiloxane having a degree of polymerisation of from 2 to 25 and at least one Si—H bond per terminal group;
in the presence of a diluent material, a suitable catalyst and optionally an end-blocking agent; and
(b) where required quenching the chain extension process;
  wherein the diluent material is substantially retained within the resulting diluted organopolysiloxane containing polymer.

The concept of "comprising" where used herein is used in its widest sense to mean and to encompass the notions of "include" and "consist of". An organosiloxane containing polymer is intended to mean a polymer comprising multiple organopolysiloxane units per molecule and is intended to include a polymer substantially containing only organopolysiloxane groups in the polymer chain or polymers where the backbone contains both organopolysiloxane groups and e.g. organic polymeric groups in the chain. Unless otherwise indicated all viscosity values given are at a temperature of 25° C. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably the diluents are miscible or at least substantially miscible with the polymeric starting materials with which they are initially mixed, and more particularly with both intermediate reaction products and the final chain extended polymer product. The term "Substantially miscible diluents" is intended to include diluents which are completely or largely miscible with the monomer and/or oligomer and/or the reaction mixture during polymerisation and hence may include low melting point solids which become miscible liquids in a reaction mixture during the polymerisation process.

In one embodiment of the present invention the pre-formed polymer component used in the present invention is a polysiloxane containing polymer containing at least two condensable groups, most preferably the condensable groups are terminal hydroxyl or hydrolysable groups. Preferably the polymer has the general formula $$X^1\text{-}A\text{-}X^2 \qquad (1)$$

where $X^1$ and $X^2$ are independently selected from silyl groups which contain in hydroxyl or hydrolysable groups and A is selected from a siloxane containing polymeric or copolymeric molecular chain or a siloxane/organic block copolymeric molecular chain. Examples of $X^1$ or $X^2$ groups incorporating hydroxyl and/or hydrolysable substituents include —$SiOH_3$, —$(R^a)SiOH_2$, —$(R^a)_2SiOH$, —$R^aSi(OR^b)_2$, —$Si(OR^b)_3$, —$R^a_2SiOR^b$ or —$R^a_2Si$—$R^c$—$SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2.

Alternatively $X^1$ and $X^2$ may both comprise a group which will undergo an addition type reaction with a suitable chain extending molecule. Preferably the addition type reaction is a hydrosilylation reaction and X and $X^1$ both contain either a silicon-hydrogen bond or unsaturated organic groups containing from 2 to 6 carbon atoms such as alkenyl groups, alkynyl groups, acrylate groups and/or alkylacrylate groups. Most preferably in this embodiment $X^1$ and $X^2$ are alkenyl groups with vinyl groups being particularly preferred. A small proportion (<20%) of $X^1$ groups may comprise trialkyl-silyl groups, in which each alkyl group is preferably methyl or ethyl.

Examples of suitable siloxane groups A in formula (I) are those which comprise a polydiorganosiloxane chain. Thus group A preferably includes siloxane units of formula (2)

$$(R^5{}_s SiO_{(4-s)/2})- \qquad (2)$$

in which each $R^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably $R^5$ is a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Group A in the compound of formula (1) may include any suitable siloxane or siloxane/organic molecular chain providing the resulting polymer a viscosity (in the absence of diluents in accordance with the present invention of up to 20 000 000 mPa·s, at 25° C. (i.e. up to or even more than 200 000 units of formula (2)). In one preferred embodiment A is a linear organopolysiloxane molecular chain (i.e. s=2) for all chain units. Preferred materials have polydiorganosiloxane chains according to the general formula (3)

$$-(R^5{}_2 SiO)_t- \qquad (3)$$

in which each $R^5$ is as defined above and is preferably a methyl group and t has a value of up to at least 200 000. Suitable polymers have viscosities of up to 20 000 000 mPa·s at 25° C. in the absence of the diluent(s) but when prepared in the presence of the diluent(s) viscosities are generally in the order of 1000 to 100 000 mPa·s at 25° C. because of the presence of the diluent(s) in the polymer matrix.

Preferred polysiloxanes containing units of formula (2) are thus polydiorganosiloxanes having terminal, silicon-bound hydroxyl groups or terminal, silicon-bound organic radicals which can be hydrolysed using moisture as defined as $X^1$ and $X^2$ above. The polydiorganosiloxanes comprising units of the structure in structure (2) may be homopolymers or copolymers. Mixtures of different polydiorganosiloxanes having terminal condensable groups are also suitable.

In the case of polydiorganosiloxane co-polymers the polymeric chain may comprise blocks made from chains of units depicted in figure (2) above where the two $R^5$ groups are:—
both alkyl groups (preferably both methyl or ethyl), or
alkyl and phenyl groups, or
alkyl and fluoropropyl, or
alkyl and vinyl or
alkyl and hydrogen groups.

Typically at least one block will comprise siloxane units in which both $R^5$ groups are alkyl groups.

Whilst preferably A is an organopolysiloxane molecular chain, A may alternatively be a block copolymeric backbone comprising at least one block of siloxane groups of the type depicted in formula (2) above and an organic component comprising any suitable organic based polymer backbone for example the organic polymer backbone may comprise, for example, polystyrene and/or substituted polystyrenes such as poly(α-methylstyrene), poly(vinylmethylstyrene), dienes, poly(p-tri methylsilylstyrene) and poly(p-trimethylsilyl-α-methylstyrene). Other organic components which may be incorporated in the polymeric backbone may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides and the like.

However perhaps the most preferred organic based polymeric blocks in A are polyoxyalkylene based blocks, which typically bond with siloxanes via a hydrosilylation reaction prior to introduction of the chain extender of the present invention. Such polyoxyalkylene blocks preferably comprise a linear predominantly oxyalkylene polymer comprised of recurring oxyalkylene units, $(-C_n H_{2n}-O-)$ illustrated by the average formula $(-C_n H_{2n}-O-)_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, $(-C_2 H_4-O-)$; oxypropylene units $(-C_3 H_6-O-)$; or oxybutylene units, $(-C_4 H_8-O-)$; or mixtures thereof. Preferably the polyoxyalkylene polymeric backbone consists essentially of oxyethylene units or oxypropylene units.

Other polyoxyalkylene blocks may include for example: units of the structure $$-[-R^e-O-(-R^f-O-)_h-Pn-CR^g{}_2-Pn-O- \\ (-R^f-O-)_q-R^e]-$$

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is a hydrogen atom or methyl group and each of the subscripts h and q is a positive integer in the range from 3 to 30.

Any suitable method for making the polymer in accordance with the method of the present invention may be used. The diluent, chain extender and catalyst may be added in any order to the polymer. In one preferred option the chain extender and catalyst are initially mixed with the polymer and the chain extension reaction is commenced with the diluent added once an increase in the viscosity of the reaction mixture has been detected. Mixing is continued until the viscosity of the resulting product becomes constant or starts to decrease with time at which point, if required, the catalyst is quenched/neutralised.

An end-blocking agent may be used to regulate the molecular weight of the polymer and/or to add functionality. End-blocking agents are a means of controlling the reactivity/polymer chain length of the polymer and as a means of introducing functionality to the resulting polymer. Suitable end-blockers are, for example, polysiloxanes in the number average molecular weight range from 160 upwards, in particular polydimethylsiloxanes having one or more functional groups such as hydroxy, vinyl or hydrogen. Functional groups introduced using end-blocking agents include alternative end groups on the polymer, e.g. silicon bonded hydrogen groups, alkenyl groups hydrolysable group such as hydroxy groups, alkoxy groups and acetoxy groups. Hydrolysable groups which may be introduced using end-blockers and where required subsequent reactions include —$SiOH_3$, —$(R^a)SiOH_2$, —$(R^a)_2SiOH$, —$R^aSi(OR^b)_2$, —$Si(OR^b)_3$, —$R^a_2SiOR^b$ or —$R^a_2Si$—$R^c$—$SiR^d_p(OR^b)_{3-p}$ where each $R^a, R^b, R^d, R^c$ p are as hereinbefore described. Water also acts as a end-blocker, with the introduction of hydroxy functional groups.

Preferably the or each diluent is/are one or more processing aids and/or plasticisers. Generally the diluent(s) used in accordance with the present invention are not intended to chemically bond to the monomer/oligomer starting materials or intermediate or final polymerisation product. However, some chemical bonding and/or reversible interactions between the polymer reaction products and diluent(s) may occur, preferably between the diluent(s) and substituents along the backbone of the polymer rather than with polymer end groups so as to form a cross-linking network between polymer and diluent thereby providing a polymer product which is less likely to result in diluent loss and/or shrinkage when used in for example a sealant composition. For the sake of clarification with respect to this paragraph the term "chemically bond" is intended to mean the formation of covalent or the like bonds and not mere chemical interactions such as hydrogen bonding or the like.

Any suitable processing aids and/or plasticiser or combination of processing aids and/or plasticisers may be utilised. These include each of the following alone or in combination with others from the list:— trialkylsilyl terminated polydialkyl siloxane where each alkyl group may be the same or different and comprises from 1 to 6 carbon atoms but is preferably a methyl group, preferably with a viscosity of from 100 to 100 000 mPa·s at 25° C. and most preferably from 1000 to 60 000 mPa·s at 25° C.;
polyisobutylenes (PIB),
phosphate esters such as trioctyl phosphate
polyalkylbenzenes,
linear and/or branched alkylbenzenes such as heavy alkylates, dodecyl benzene and other alkylarenes,
esters of aliphatic monocarboxylic acids;
dialkyl phthalates wherein the alkyl group may be linear and/or branched and contains from six to 20 carbon atoms such as dioctyl, dihexyl, dinonyl, didecyl, diallanyl and other phthalates;
adipate, azelate, oleate and sebacate esters,
tung oil,
fatty acids and/or esters of fatty acids.
polyols such as ethylene glycol and its derivatives,
organic phosphates such as tricresyl phosphate and/or triphenyl phosphates and/or castor oil.
linear or branched mono unsaturated hydrocarbons such as linear or branched alkenes or mixtures thereof containing from 12 to 25 carbon atoms; and/or
mineral oil fractions comprising linear (e.g. n-paraffinic) mineral oils, branched (iso-paraffinic) mineral oils, cyclic (referred in some prior art as naphthenic) mineral oils and mixtures thereof. Any suitable compatable mineral oil may be used, examples include linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule.

Preferred processing aids include the mineral oil fractions, alkylcycloaliphatic compounds and alkybenzenes including polyalkylbenzenes and for some applications polydialkylsiloxanes with terminal groups which are unreactive with the polymer. Such compounds may be utilised in the present invention where appropriate but preferably those used have an initial boiling point of greater than 200° C. (ASTM D-86).

Any suitable mixture of mineral oil fractions may be utilised as the extender in the present invention but high molecular weight extenders (e.g. >number average molecular weight of 220) are particularly preferred. Examples include:—
alkylcyclohexanes (molecular weight >220);
paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
(i) 60 to 80% paraffinic and 20 to 40% naphthenic and a maximum of 1% aromatic carbon atoms;
(ii) 30-50%, preferably 35 to 45% naphthenic and 70 to 50% paraffinic and or isoparaffinic oils;
(iii) hydrocarbon fluids containing more than 60 wt. % naphthenics, at least 20 wt. % polycyclic naphthenics and an ASTM D-86 boiling point of greater than 235° C.;
(iv) hydrocarbon fluid having greater than 40 parts by weight naphthenic hydrocarbons and less than 60 parts by weight paraffinic and/or ispoaraffinic hydrocarbons based on 100 parts by weight of hydrocarbons.

Preferably the mineral oil based extender or mixture thereof comprises at least one of the following parameters:—
(i) a molecular weight of greater than 150, most preferably greater than 200;
(ii) an initial boiling point equal to or greater than 230° C. (according to ASTM D 86).
(iii) a viscosity density constant value of less than or equal to 0.9; (according to ASTM 2501)
(iv) an average of at least 12 carbon atoms per molecule, most preferably 12 to 30 carbon atoms per molecule;
(v) an aniline point equal to or greater than 70° C., most preferably the aniline point is from 80 to 110° C. (according to ASTM D 611);
(vi) a naphthenic content of from 20 to 70% by weight of the extender and a mineral oil based extender has a paraffinic content of from 30 to 80% by weight of the extender according to ASTM D 3238);
(vii) a pour point of from −50 to 60° C. (according to ASTM D 97);
(viii) a kinematic viscosity of from 1 to 20 cSt at 40° C. (according to ASTM D 445)
(ix) a specific gravity of from 0.7 to 1.1 (according to ASTM D1298);
(x) a refractive index of from 1.1 to 1.8 at 20° C. (according to ASTM D 1218)
(xi) a density at 15° C. of greater than 700 kg/m³ (according to ASTM D4052) and/or (xii) a flash point of greater than 100° C., more preferably greater than 110° C. (according to ASTM D 93)
(xiii) a saybolt colour of at least +30 (according to ASTM D 156)
(xiv) a water content of less than or equal to 250 ppm (according to ASTM D6304)
(xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as processing aids and/or plasticisers are compounds which have aryl groups, especially benzene substituted by alkyl and possibly other substituents, and a molecular weight of at least 200. Examples of such processing aids are described in U.S. Pat. No. 4,312,801, the content of which is incorporated herein by reference. These compounds can be represented by general formula (I), (II), (III) and (IV)

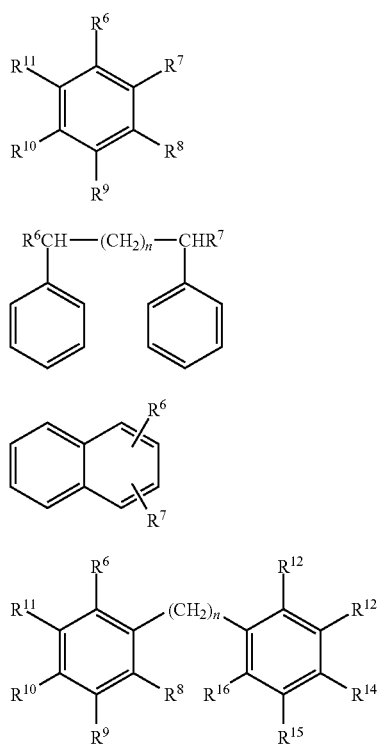

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the processing aid used in accordance with the process of the present invention is of formula (I) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230-330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (V).

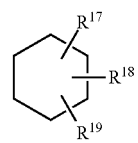

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

The amount of diluent which may be included in the composition will depend upon factors such as the purpose to which the composition is to be put, the molecular weight of the diluent(s) concerned etc. Polymer products in accordance with the present invention may contain from 5% w/w up to 70% w/w diluent (based on the combined weight of polymer and diluent(s)) depending upon these factors. In general however, the higher the molecular weight of the diluent(s), the less will be tolerated in the composition. Typical compositions will contain up to 70% w/w diluent(s). More suitable polymer products comprise from 30-60% w/w of a linear diluent(s) whereas 25-35% w/w will be more preferred when the diluent is a heavy alkylate.

The chain extender may be any suitable molecule as hereinbefore described which will react with the polymer to generate a reaction product with a greater polymer chain length (i.e. dp and molecular weight). Preferably the chain extender is a silane or short chain siloxane (i.e. having an average chain length of from 2 to about 25) with two reactive end groups designed to react with the terminal groups of the pre-formed polymer.

For pre-formed polymers with hydroxy or otherwise condensable end groups suitable chain extender include for example:—

Diacetamidosilanes such as dialkyldiacetamidosilanes or alkenylalkyldiacetamidosilanes, particularly methylvinyldi(N-methylacetamido)silane, or dimethyldi(N-methylacetamido)silane diacetoxysilanes, such as dialkyldiacetoxysilanes and alkylalkenyldiacetoxysilanes diaminosilanes, such as dialkyldiaminosilanes or alkylalkenyldiaminosilanes particularly those where each amino group has one Si—N bond and two N—C bonds;

dialkoxysilanes such as dimethoxydimethylsilane and diethoxydimethylsilane;

a polydialkylsiloxane having a degree of polymerisation of from 2 to 25 and having at least two acetamido or acetoxy or amino or alkoxy or amido or ketoximo substituents per molecule, wherein each alkyl group independently comprises from 1 to 6 carbon atoms;

hexaorganocyclotrisilazanes, octoorganocyclotetrasilazanes, diamidosilanes such as dialkyldiamidosilanes or alkylalkenyldiamidosilanes diketoximinosilanes such as dialkylkdiketoximinosilanes and alkylalkenyldiketoximinosilanes α-aminoalkyldialkoxyalkylsilanes wherein the alkyl and alkoxy groups contain from 1 to 5 carbon atoms, such as α-aminomethyldialkoxymethylsilanes particularly preferred are those where aminomethyl group is an N,N-dialkylaminomethyl group and chain extenders in the form of silicon compounds having the formula $ZMe_2SiO(Me_2SiO)_ySiMe_2Z$ or $ZMe_2Si—Y—SiMe_2Z$ where Z, Y, y and m are as hereinbefore described.

Specific examples of chain extenders include alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, and alkenylalkyldihydroxysilanes such as vinyl methyl dihydroxysilane, vinyl ethyldihydroxysilane, vinyl methyldihydroxysilane, vinylethyldihydroxysilane.m-ethylphenyl-dimethoxysilane, di-butoxy diacetoxysilane, Alkylalkenylbis(N-alkylacetamido) silanes such as methylvinyldi-(N-methylacetamido)silane and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane, methylvinyl bis(N-methylacetamido)silane, methylhydrogendiacetoxysilane, dimethylbis(N-diethylaminoxy)silane and dimethylbis(sec.-butylamino)silane. The chain extender used may also comprise any combination of two or more of the above.

For pre-formed polymers with alkenyl or Si—H end groups suitable for addition reactions via a hydrosilylation route chain extender include for example:—
A silane comprising two alkenyl groups, a dihydrosilane, a polydialkylsiloxane having a degree of polymerisation of from 2 to 25 and at least one Si-alkenyl bond per terminal group,
A polydialkylsiloxane having a degree of polymerisation of from 2 to 25 and at least one Si—H bond per terminal group and wherein each alkyl group independently comprises from 1 to 6 carbon atoms;
organosilicon compounds with the general formula

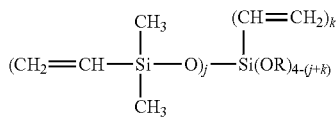

in which R is as hereinbefore described, j is 1, 2, or 3, k is 0 or 1, and j+Fk is 2 or 3.
exemplified by compounds with the following formulas,
$(ViMe_2SiO)_2SiVi(OMe)_1(ViMe_2SiO)_1SiVi(OMe)_2$,
$(ViMe_2SiO)_2SiVi(OEt)_1.(ViMe_2SiO)_1SiVi(OEt)_2$,
$(ViMe_2SiO)_3Si(OMe)_1(ViMe_2SiO)_2Si(OMe)_2$,
$(ViMe_2SiO)_3 Si(OEt)_1$ and $(ViMe_2SiO)_2Si(OEt)_2$
As used herein, Vi represents a vinyl group, Me represents a methyl group, and Et represents an ethyl group.

The catalyst used to catalyse the chain extension reaction is determined by the reaction to take place. The composition further comprises a condensation catalyst. In the case where the reaction involved in chain extension is a condensation reaction, any suitable condensation catalyst may be utilised to chain extend the polymer composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred.

Chain extension reactions which contain oximosilanes or acetoxysilanes generally use a tin catalyst for curing, such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate. Dibutyltin dilaurate, dibutyltin diacetate are particularly preferred.

For compositions which include alkoxysilane based chain extender compounds, the preferred catalysts are titanate or zirconate compounds. Such titanates may comprise a compound according to the general formula $Ti[OR^{21}]_4$ where each $R^{21}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{21}$ include but are not restricted to methyl, ethyl, propyl, isopropyl, butyl, tertiary butyl and a branched secondary alkyl group such as 2,4-dimethyl-3-pentyl. Preferably, when each $R^{21}$ is the same, $R^{21}$ is an isopropyl, branched secondary alkyl group or a tertiary alkyl group, in particular, tertiary butyl.

Examples include tetrabutyltitanate, tetraisopropyltitanate, or chelated titanates or zirconates (the chelation may be with any suitable chelating agent such as an alkyl acetylacetonate such as methyl or ethylacetylacetonate) such as for example diisopropyl bis(acetylacetonyl)titanate, diisopropyl bis(ethylacetoacetonyl)titanate, diisopropoxytitanium Bis (Ethylacetoacetate) and the like. Further examples of suitable catalysts are described in EP1254192 which is incorporated herein by reference. The amount of catalyst used depends on the cure system being used but typically is from 0.01 to 3% by weight of the total composition Preferably the catalyst, component (d), will be present in an amount of from about 0.1 to 3 weight % of the composition component (d) may be present in a greater amount in cases where chelating agents are used.

In the case where the reaction between polymer and chain extender is an addition reaction, the addition reaction is preferably a hydrosilylation reaction for which the catalyst chosen may comprise any suitable hydrosilylation catalyst such as a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is a platinum based catalyst. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^2_4$, $H_aRh_bolefin_cCl_d$, $Rh(O(CO)R^3)_{3-n}(OH)_n$ where $X^4$ is hydrogen, chlorine, bromine or iodine, Y is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^4)(En)_2]_2$, or $(Ir(Z^4)(Dien)]_2$, where $Z^4$ is chlorine, bromine, iodine, or alkoxy, En is an olefin and Dien is cyclooctadiene may also be used.

One of the most important aspects of the present invention is the fact that by polymerising the polymer in the presence of the diluent(s) the resulting polymer/processing aids and/or polymer/plasticiser mix throughout the polymerisation process has a significantly lower viscosity than would normally be expected because the viscosity reducing diluent(s) is/are present in the polymer mixture as it polymerises. It is to be understood that this is the case even when only a small amount e.g. 5-20% by weight is present for the polymerisation process in accordance with the present invention. For example using the standard process of mixing diluent(s) with filler and ready made polymer together one would typically only be able to incorporate approximately 28% by weight of diluent(s) in an 80 000 mPa·s polymer because of problems with handling and blending using polymers of greater viscosity. By introducing the diluent(s) prior to polymerisation, blending problems are avoided and the resulting polymers may be utilised for alternative applications than are usually utilised using organopolysiloxane gums of several million mPa·s.

The process of the present invention enables a significantly greater amount of diluent(s) to be used, in conjunction with polymers having viscosities not previously contemplated because of handling problems. The ratio between the diluent (s) and the silicone phase that can be achieved is dependent on the miscibility of the diluent(s) in the polydimethylsiloxanes and vice versa. The miscibility was found to depend at least in part, on the molecular weight of the polydimethylsiloxanes.

This combination also provides the user with formulations comprising the diluted polymer of the present invention with a variety of improved physical characteristics, not least the elasticity of resulting products, because of the use of polymers having polymer chain length/viscosities which hitherto would not have been possible to use. Applications include, sealants formulations, coating formulations, high consistency organopolysiloxane gum formulations for high consistency rubber applications, and for dispersions thereof alkylsilicone fluids for use in personal care products.

In accordance with the present invention there is provided a method of making an a moisture curable composition capable of cure to an elastomeric body comprising the steps of:—
(i) Preparing a diluted chain extended organopolysiloxane containing polymer as hereinbefore described using a condensable, preferably hydroxy or otherwise hydrolysable group containing end-blocker
(ii) compounding the resulting diluted organopolysiloxane polymer with
(iii) (i) a suitable cross-linking agent which is reactive with the organopolysiloxane polymer,
(ii) a suitable condensation catalyst and optionally
(iii) filler.

Optionally a small proportion (<20%) of $X^1$ groups may comprise trialkylsilyl groups, in which each alkyl group is preferably methyl or ethyl.

In one embodiment the process is used to prepare a one or two part organopolysiloxane sealant composition. A two part composition comprises in the first part diluted polymer and filler (when required) and in the second part catalyst and cross-linker are provided for mixing in an appropriate ratio (e.g. from 1:1 to 10:1) immediately prior to use. Additional additives to be discussed below may be provided in either part 1 or part 2 of the part composition but are preferably added in part two.

In accordance with the present invention there is provided a moisture curable composition capable of cure to an elastomeric body obtainable by a process comprising the steps of:—
(iv) Preparing a diluted chain extended organopolysiloxane containing polymer as hereinbefore described using a condensable, preferably hydroxy or otherwise hydrolysable group containing end-blocker
(v) compounding the resulting diluted organopolysiloxane polymer with
(vi) (i) a suitable cross-linking agent which is reactive with the organopolysiloxane polymer,
(ii) a suitable condensation catalyst and optionally
(iii) filler.

In accordance with a still further embodiment of the present invention there is provided a moisture curable composition capable of cure to an elastomeric body, the composition comprising
a) A diluted chain extended organopolysiloxane containing polymer having not less than two silicon-bonded condensable (preferably hydroxyl or hydrolysable) groups obtainable as hereinbefore described;
b) A siloxane and/or silane cross-linker having at least two groups per molecule which are reactable with the condensable groups in (a);
c) Optionally one or more fillers and
d) a suitable cure catalyst Preferably the polymeric constituent of the diluted polymer in accordance with the present invention has the general formula $$X^1\text{-}A\text{-}X^2 \tag{1}$$

Where A, $X^1$ and $X^2$ are as hereinbefore described. Preferably the polymer produced in accordance with the present invention has an average number molecular weight (Mn) greater than 132,000 and a degree of polymerisation of greater than 1800 as determined by ASTM D5296-05 with the weight values being determined in terms of polystyrene molecular weight equivalents.

Any suitable cross-linker may be used. The cross-linker used (b) in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker may have two but preferably has three or four silicon-bonded condensable (preferably hydrolysable) groups per molecule. When the cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above. Compositions may contain, for example, from 2-30% w/w of cross-linker, but generally from 2 to 10% w/w. Acetoxy cross-linkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst of the type as hereinbefore described in the chain extension of polymers having OH or condensable end groups.

Compositions of this invention may contain, as optional constituents, other ingredients which are conventional to the formulation of silicone sealants and the like. For example, the compositions will normally contain one or more finely divided, reinforcing fillers such as high surface area fumed and precipitated silicas including rice hull ash and to a degree calcium carbonate, and/or one or more or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components. The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 800 parts by weight, preferably 25 to 400 parts by weight per 100 parts by weight of the polymer excluding the diluent portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, cure modifiers, fungicides and/or biocides and the like (which may suitably by present in an amount of from 0 to 8.0% by weight). It will be appreciated that some of the additives are included in more than one list of additives. Such additives would then have the ability to function in all the different ways referred to. Water scavengers e.g. isocyanates such as cyclohexylisocyanate, isophorone diisocyanate and hexamethylene diisocyanate, sometimes referred to as deactivators may be incorporated in the composition but are preferably not utilised.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane epoxyalkylalkoxy silane, mercaptoalkylalkoxy silane, and derivatives thereof.

Heat stabilizers may include Iron oxides and carbon blacks, Iron carboxylate salts, cerium hydrate, barium zirconate, titania, cerium and zirconium octoates, and porphyrins.

Flame retardants may include for example, carbon black, hydrated aluminium hydroxide, and silicates such as wollastonite, platinum and platinum compounds.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]} carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]} carbamate, ethoxyethyl N-{2-[1-(N-propylcarbamoyl)benzimidazolyl]} carbamate, ethoxyethyl N-{2-[1-(N-butylcarbamoyl)benzimidazolyl]} carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]} carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]} carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

The compositions are preferably room temperature vulcanisable compositions in that they cure at room temperature without heating.

The compositions can be prepared by mixing the ingredients employing any suitable mixing equipment. Other components may be added as necessary. For example preferred one part, moisture curable compositions may be made by mixing together the extended polysiloxane having hydroxyl or hydrolysable groups and any organosilicon plasticizer or filler used, and mixing this with a pre-mix of the cross-linker and catalyst. UV-stabilisers pigments and other additives may be added to the mixture at any desired stage.

After mixing, the compositions may be stored under substantially anhydrous conditions, for example in sealed containers, until required for use.

The polymerisation in the presence of the diluent gives several advantages with respect to sealant formulations. In respect to rheology, the increase in polymer chain length enabled due to the presence of the diluent compensates for the amount of diluent present in the diluted sealant and as such the viscosity of the diluted polymer is significantly higher than it would be if the diluent had been added to a standard polymer used in sealant formulations currently having for example a viscosity of 80000 to 100 000 mPa·s at 25 deg C. The lower modulus of the resulting sealant additionally means that more movement is possible in the joint being sealed, to the extent that even if diluent loss occurs, the effective modulus caused by the presence of high molecular weight polymers which may be prepared in accordance with the process of the present invention is able to compensate for stress caused to the seal due to shrinkage. The product of the process of the present invention gives superior processing advantages due to the comparatively low viscosity of the diluted polymer when considering the molecular weight of the polymer.

Thus in a further aspect, the invention provides a method of sealing a space between two units, said method comprising applying a composition as described above and causing or allowing the composition to cure. Suitable units include glazing structures or building units as described above and these form a further aspect of the invention.

The applicants have found that sealant formulations according to the present invention provides the user with a very highly elastic sealant subsequent to curing because of the high chain length/viscosity of the polymer being used (when one considers the viscosity in the absence of the diluent). Such sealants provide an elongation at break of significantly greater than 650%.

In one embodiment the process is used to prepare a one or two part organopolysiloxane sealant composition. A two part composition comprises in the first part diluted polymer and filler (when required) and in the second part catalyst and cross-linker are provided for mixing in an appropriate ratio (e.g. from 1:1 to 10:1) immediately prior to use. Additional additives to be discussed below may be provided in either part 1 or part 2 of the part composition but are preferably added in part two.

One particular problem which the silicone based sealant industry have had to contend with is the production of a paintable cured sealant surface. Typically this has not been possible with the vast majority of current cured silicone sealant formulations (if any in real terms). However, the applicants have found that highly filled sealant formulations comprising low levels (e.g. <15% by weight) of a high molecular weight silicone polymer diluted in an organic compound are readily paintable because of the low proportion of silicone compounds present in the formulation. This typically would not have been possible because of the handling and mixing difficulties encountered with these high molecular weight polymers as well as the poor elongation properties associated with highly filled sealants. Tests suggest that said paintable sealant formulations are comparable if not an improvement over acrylic type fillers and because of their reduction in the amount of silicone present are of comparable price.

In an additional embodiment of the present invention there is provided a method of producing a condensation cured silicone elastomer with a surface coated with a hardened protective coating comprising, exposing a composition in accordance with process as hereinbefore described to moisture until a cured elastomeric surface is obtained and a homogeneous dull surface develops, thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

A further advantage of polymers made by the process of the present invention is that they contain very low levels of cyclic siloxanes after polymerisation has completed.

In a further application of the present invention the diluted polymer resulting from the polymerisation process may be dispersed in a volatile or non-volatile low molecular weight organopolysiloxane containing fluid having a viscosity of between 4 and 100 mPa·s for use in personal care applications. Preferably in this application the diluent is an trialkylsilyl terminated polydialkylsiloxane plasticiser.

The volatile silicone is appropriately a low viscosity dialkylsiloxane (typically a dimethylsiloxane) fluid which preferably contains dimethylsiloxane units and optionally trimethylsiloxane units and preferably a viscosity of less than about 10 mPa·s at 25° C. The low viscosity dialkylsiloxane fluid, may be either a cyclopolysiloxane having a degree of polymerisation of from 3 to 10 or a linear siloxane compound having a degree of polymerisation of from 1 to 10, preferably between 1 and 5.

The cyclopolysiloxane compounds have been assigned the adopted name "CYCLOMETHICONE" by The Cosmetics, Toiletries and Fragrance Association, Inc., Washington, D.C. (CTFA). Both the cyclopolysiloxanes and the linear siloxanes are clear fluids, and are essentially odourless, nontoxic, nongreasy and nonstinging. Cosmetically, these volatile alkylsilicone fluids are nonirritating to skin, and exhibit enhanced spreadability and ease of rub-out when applied. Once applied, the materials evaporate leaving behind no residue.

Alkylsilicone fluids which are operable in accordance with the present invention leave substantially no residue after thirty minutes at room temperature when one gram of fluid is placed at the centre of a No. 1 circular filter paper having a diameter of 185 mm supported at its perimeter in open room atmosphere. Representative linear alkylsilicone fluids include hexamethyldisiloxane which has a boiling point of 99.5° C. and octamethyltrisiloxane which has a boiling point of 152° C. Representative cyclic alkylsilicone fluids suitable for the present application include hexamethylcyclotrisiloxane which has a boiling point of 133° C.; octamethylcyclotetrasiloxane which has a boiling point of 171° C. and decamethylcyclopentasiloxane which has a boiling point of 205° C. These alkylsilicone fluids may be used alone, or as mixtures in combinations of two or more of the individual fluids. Mixtures of the alkylsilicone fluids will result in a volatile material having an evaporating behaviour different from any one of the individual alkylsilicone fluids. The alkylsilicone fluids and their methods of preparation are known in the art, and such fluids are commercially available.

In some instances, it may be desirable to replace one or more of the methyl groups in the alkylsilicone fluid with other groups. Thus, there may be substituted groups such as alkyl radicals having two to twelve carbon atoms; aryl radicals having six to ten carbon atoms; amine groups; vinyl; hydroxy; haloalkyl groups; aralkyl groups; and acrylate groups.

Compositions in accordance with the present invention comprising a blend of the diluted polymer dispersed in the alkylsilicone fluid may additionally contain a surfactant selected from the group consisting of anionic and amphoteric surfactants. The surfactant system should provide an acceptable level of foam on the hair and be capable of cleaning the hair, and may comprise one or more water soluble detergents, i.e., an anionic or amphoteric surfactant. Suitable anionic detergents include sulfonated and sulphated alkyl, aralkyl and alkaryl anionic detergents; alkyl succinates; alkyl sulfosuccinates and N-alkyl sarcosinates. Especially preferred are the sodium, magnesium, ammonium, and the mono-, di- and triethanolamine salts of alkyl and aralkyl sulphates as well as the salts of alkaryl sulfonates. The alkyl groups of the detergents generally have a total of from about 12 to 21 carbon atoms, may be unsaturated, and are preferably fatty alkyl groups. The sulphates may be sulphate ethers containing one to ten ethylene oxide or propylene oxide units per molecule. Preferably, the sulphate ethers contain 2 to 3 ethylene oxide units.

Typical anionic detergents include, among others, sodium lauryl sulphate, sodium lauryl ether sulphate, ammonium lauryl sulphate, triethanolamine lauryl sulphate, sodium C14-16 olefin sulfonate, ammonium pareth-25 sulphate (ammonium salt of a sulphated polyethylene glycol ether of a mixture of synthetic C12-15 fatty alcohols), sodium myristyl ether sulphate, ammonium lauryl ether sulphate, disodium monooleamidosulfosuccinate, ammonium lauryl sulfosuccinate, sodium dodecylbenzene sulfonate, triethanolamine dodecylbenzene sulfonate and sodium N-lauroyl sarcosinate. The most preferred anionic detergents are the lauryl sulphates, particularly monoethanolamine, triethanolamine, ammonium and sodium lauryl sulphates. Sodium lauryl ether sulphate is also very suitable for use in the compositions in accordance with the present invention.

Surfactants generally classified as amphoteric or ampholytic detergents include, among others, cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric detergents include the quaternary cycloimidates, betaines such as alpha-(tetradecyldimethylammonio)acetate, beta-(hexadecyldiethylammonio)propionate, and gamma-(dodecyldimethylammonio)butyrate., and sultaines such as 3-(dodecyldimethylammonio)-propane-1-sulfonate, and 3-(tetradecyldimethylammonio)ethane-1-sulfonate.

The compositions of this invention may contain a nonionic surfactant. The nonionic surfactants of the present invention are selected from the group consisting of fatty acid alkanolamide and amine oxide surfactants. The fatty acid alkanolamides are nonionic surfactants obtained by reacting alkanolamines such as monoethanolamine, diethanolamine, monoisopropanolamine, or diisopropanolamine with a fatty acid or fatty acid ester to form the amide. The hydrophobic portion of the nonionic surfactant is provided by a fatty acid hydrocarbon chain which generally has from 10 to 21 carbon atoms. The fatty acid alkanolamide surfactants include, for example, fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide.

The amine oxides are well known nonionic surfactants usually obtained by oxidizing a tertiary amine to form the amine oxide. They are sometimes also referred to as polar nonionic surfactants. Amine oxide surfactants include, for example, the N-alkyl amine oxides such as N-cocodimethylamine oxide, N-lauryl dimethylamine oxide, N-myristyl dimethylamine oxide, and N-stearyl dimethylamine oxide; the N-acyl amine oxides such as N-cocamidopropyl dimethylamine oxide and N-tallowamidopropyl dimethylamine oxide; and N-alkoxyalkyl amine oxides such as bis(2-hydroxyethyl) C12-15 alkoxy-propylamine oxide. The hydrophobic portion of the amine oxide surfactants is generally provided by a fatty hydrocarbon chain containing from 10 to 21 carbon atoms.

For purposes of this invention the alkanolamide and amine oxide surfactants are preferred. In general, the fatty acid diethanolamides and N-alkyl dimethylamine oxides are preferred for use in the compositions. Especially preferred are the fatty acid diethanolamides and N-alkyl dimethylamine oxides where the fatty hydrocarbon chain contains from 10 to 18 carbon atoms. For example, especially preferred nonionic surfactants include lauric acid diethanolamide, N-lauryl dimethylamine oxide, coconut acid diethanolamide, myristic acid diethanolamide, and oleic acid diethanolamide.

Additional categories of surfactant materials may also be included such as cationic and zwitterionic surfactants, and representative compounds are set forth in detail in U.S. Pat. No. 4,902,499, issued Feb. 20, 1990, which is considered to be incorporated herein by reference.

Other adjuvants may be added to compositions in accordance with the present invention comprising a blend of the diluted polymer dispersed in the alkylsilicone fluid include for example thickeners, perfumes, colorants, electrolytes, pH control ingredients, foam boosters and foam stabilizers, antimicrobials, antioxidants, ultraviolet light absorbers and medicaments. For example, it is sometimes preferred to employ a thickener in the compositions to facilitate the hand application of the composition to the hair. Thickeners are preferably used in sufficient quantities to provide a more luxurious effect. For example, viscosities within the range of 6,000 to 12,000 mPa·s measured at 25° C. Suitable thickeners, include, among others, sodium alginate, gum arabic, polyoxyethylene, guar gum, hydroxypropyl guar gum, cellulose derivatives such as methylcellulose, methyl hydroxypropylcellulose, hydroxypropylcellulose, polypropylhydroxyethylcellulose, starch and starch derivatives such as hydroxyethylamylose, and starch amylose, locust bean gum, electrolytes such as sodium or ammonium chloride, saccharides such as fructose and glucose, and derivatives of saccharides such as PEG-120 methyl glucose dioleate.

The perfumes which can be used in the compositions are cosmetically acceptable perfumes. Colorants are used to confer a colour to the composition and may generally be used. Although not required, it is preferred to employ an acid to adjust the pH within the range of 5 to 9 or more preferably within the range of 6 to 8 in the compositions of this invention. Any water soluble acid such as a carboxylic acid or a mineral acid is suitable. For example, suitable acids include mineral acids such as hydrochloric, sulphuric, and phosphoric, monocarboxylic acids such as acetic acid, lactic acid, or propionic acid; and polycarboxylic acids such as succinic acid, adipic acid and citric acid.

If for special purposes additional conditioners are desired, they may be added. For example, any of the well-known organic cationic hair conditioning components may be added. Some cationic conditioning components that may be used in the present invention to provide hair grooming include quaternary nitrogen derivatives of cellulose ethers, homopolymers of dimethyldiallyl-ammonium chloride, copolymers of acrylamide and dimethyldiallylammonium chloride, homopolymers or copolymers derived from acrylic acid or methacrylic acid containing cationic nitrogen functional groups attached to the polymer via ester or amide linkages, polycondensation products of N,N'-bis-(2,3-epoxypropyl)-piperazine or of piperazine-bis-acrylamide and piperazine, poly-(dimethylbutenylammonium chloride)-.alpha, omega.-bis-(triethanol-ammonium) chloride, and copolymers of vinylpyrrolidone and acrylic acid esters with quaternary nitrogen functionality. The above cationic organic polymers and others are described in more detail in U.S. Pat. No. 4,240,450 which is hereby incorporated by reference to further describe the cationic organic polymers. Other categories of conditioners such as monomeric quaternary amine salts may also be employed.

A preservative may be required and representative preservatives which may be employed include about 0.1-0.2 weight percent of compounds such as formaldehyde, dimethyloldimethylhydantoin, 5-bromo-5-nitro-1,3-dioxane, methyl- and propyl para-hydroxybenzoates, and mixtures of such benzoates with sodium dehydroacetate, sorbic acid, and imidazolidinyl urea.

Compositions in accordance with the present invention comprising a blend of the diluted polymer dispersed in the alkylsilicone fluid may additionally contain may also be formulated to include dyes, colorants, reducing agents, neutralizing agents, and preservatives, necessary for their application as permanent wave systems or hair dyes, for example. The active formulation can be applied in several different forms including lotions, gels, mousses, aerosols, and pump sprays, for example, and as conditioners and shampoos. The active ingredient may include a carrier, and suitable carrier fluids for hair care formulations are water as well as, for example, such fluids as alcohols namely ethanol or isopropanol, hydrocarbons and halogenated hydrocarbons as mineral spirits and trichloroethane, cyclic siloxanes, and aerosol propellants.

When the composition is intended for aerosol application, propellant gases can be included such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Resulting products may be in the form of ointments, creams, gels, pastes, foams, aerosols and the like. They may be present in pharmaceutical, medical and/or therapeutic applications analgesic; anaesthetic; anti-acne; antibacterial; anti-yeast; antifungal; antivirals; antidandruff; antidermatitis; antipruritic; antiemetic; anti-motion sickness; anti-inflammatory; antihyperkeratolytic; anti-dry skin; antiperspirant; antipsoriatic; antiseborrheic; hair conditioning; hair treatment; anti-aging; antiwrinkle; anti-asthmatic; bronchodilator; sunscreen; antihistamine; skin-lightening; depigmenting; wound-healing; vitamin; corticosteroid; tanning or hormonal. Products of this type are commonly used include hair care products such as shampoos, hair conditioners, hair colorants, hairstyling preparations, such as setting lotions and hairsprays and permanent wave preparations, skin care products such as facial or body powders, blushers, eyeshadows, eyeliners, bath grains or pellets, lipsticks, moisturisers, cosmetics, hand and body lotions, concealers, compact powders, foundations and sun care products such as sun screen formulations In a still further embodiment of the present invention a diluted polymer in accordance with the present invention may be incorporated into a high viscosity silicone rubber composition In accordance with the present invention there is provided a method of making a silicone rubber composition comprising the steps of:—

Preparing a diluted organopolysiloxane containing polymer as hereinbefore described optionally with an alkenyl group, condensable group, silyl-hydride or trimethylsilyl containing end-blocker and with a siloxane based diluent; compounding the resulting diluted organopolysiloxane polymer with one or more reinforcing and/or non reinforcing fillers and a curing agent.

In the present embodiment any filler or combination of fillers as hereinbefore described may be utilised. Usually the filler content of the composition will reside within the range from about 5 to about 200 parts by weight per 100 parts by weight of the polymer excluding the diluent portion.

A curing agent, as noted above, is required and compounds which can be used herein include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

The present compositions can also be cured and/or cross-linked by a hydrosilylation reaction catalyst in combination with an organohydrogensiloxane as the curing agent instead of an organic peroxide, providing a majority of polymer molecules which contain at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25° C. The silicon-bonded organic groups present in the organohydrogensiloxane can include substituted and unsubstituted alkyl groups of 1-4 carbon atoms that are otherwise free of ethylenic or acetylenic unsaturation.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably the hydrosilylation catalyst may be any hydrosilylation catalyst hereinbefore described but is preferably a platinum based catalyst.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

The curing agent may alternatively be a condensation reaction catalyst because the present compositions may alternatively be cured and/or cross-linked by a condensation reaction in combination with a siloxane and/or silane cross-linker having at least two and preferably at least three groups reactable with hydroxyl or hydrolysable groups provided a majority of polymer molecules contain at least two condensable groups as hereinbefore described suitable for reaction with said cross-linker.

Optional additives for a high consistency rubber composition may comprise one or more of the following rheology modifiers, pigments, colouring agents, anti-adhesive agents adhesion promoters, heat stabilisers, blowing agents, flame retardants, electrically and/or thermally conductive fillers, and desiccants, each of which are preferably as hereinbefore described.

Other optional ingredients which may be incorporated in the composition of a high consistency silicone rubber include handling agents, peroxide cure co-agents, acid acceptors, and UV stabilisers.

Handling agents are used to modify the uncured properties of the silicone rubber such as green strength or processability sold under a variety of trade names such as SILASTIC® HA-1, HA-2 and HA-3 sold by Dow Corning corporation)

Peroxide cure co-agents are used to modify the properties, such as tensile strength, elongation, hardness, compression set, rebound, adhesion and dynamic flex, of the cured rubber. These may include di- or tri-functional acrylates such as Trimethylolpropane Triacrylate and Ethylene Glycol Dimethacrylate; Triallyl Isocyanurate, Triallyl Cyanurate, Polybutadiene oligomers and the like. Silyl-hydride functional siloxanes may also be used as co-agents to modify the peroxide catalysed cure of siloxane rubbers.

The acid acceptors may include Magnesium oxide, calcium carbonate, Zinc oxide and the like.

The ceramifying agents can also be called ash stabilisers and include silicates such as wollastonite.

The silicone rubber composition in accordance with this embodiment may be made by any suitable route, for example one preferred route is to first make a silicone rubber base by heating a mixture of fumed silica, a treating agent for the silica, and the diluted organopolysiloxane polymer of the present invention. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters. In a second preferred route the diluted organopolysiloxane polymer of the present invention and any desired filler plus any desired treating agent are fed into a reactor and mixed, further additives as described above including cure agents are then fed into the same reactor and further mixed.

Other potential applications of the present invention include use of the diluted polymer in hot melt adhesives, pressure sensitive adhesives, in encapsulants for solar cells and any other applications requiring the use of organopolysiloxane gums.

The invention will now be described by way of Example. For the sake of comparison the diluent used in both examples was a commercially available processing aid called HYDROSEAL® G250H, a hydrotreated mineral oil cut (n-para 7%/iso-para 51% and naphthenic 42%) produced by Total Fina.

EXAMPLE 1

Chain Extension Using a Dibutylacetoxysilane

Production of the Polymer 50 g of dimethylhydroxy terminated polydimethylsiloxane having a viscosity of 80,000 mPa·s at 25° C. was placed in a suitable container. 0.2 g of dibutoxydiacetoxysilane (DBDAc) and 500 ppm weight (in relation to the polymer) of dibutyltindiacetate catalyst were added together with a stoichiometric quantity of water to hydrolyze the acetoxy groups on the DBDAc. As soon as an initial viscosity increase in viscosity was detected 50 g of processing aid were introduced into the reaction mixture and the variation in viscosity was tracked until the viscosity of the product reached a maximum.

Sealant Formulation

The resulting polymer sealant is formulated with 86.485% weight polymer produced as described above, 5% weight of a 50% mixture of methyl triacetoxysilane and ethyl triacetoxysilane cross-linker, 8% weight of fumed silica, 0.5% weight of Poly (PO)(EO) (rheology modifier) and 0.015% of dibutyltindiacetate catalyst. The sealant properties are shown in Table 1.

Adhesion test (7dRT) was carried out to show that a bead of sealant successfully bonded to a standard glass plate after being allowed to cure at 23° C. and 50% relative humidity for 7 days. Adhesion was assessed by subsequent to the curing period the beads were pulled at 90° and the failure was rated as follows:

0: adhesive failure—poor adhesion)
1: boundary or mixed mode (adhesive/cohesive) failure—acceptable adhesion.
2: cohesive failure—excellent adhesion Adhesion test (7H$_2$O) was carried out to show that a bead of sealant successfully bonded to a standard glass plate after being allowed to cure at 23° C. and 50% relative humidity for 7 days and then subsequently 7 days in water. The bead of sealant was pulled as in adhesion test (7dRT).

The cure in depth tests were undertaken to determine how far below the surface the sealant had hardened in 24 and 72 hours by filling a suitable container (avoiding the introduction of air pockets) with sealant, curing the sealant contained in the container for the appropriate period of time at room temperature (about 23° C.) and about 50% relative humidity. After the appropriate curing time the sample is removed from the container and the height of the cured sample is measured.

TABLE 1

| Standards properties | Test method | |
|---|---|---|
| Tack Free Time (min) | ASTM D2377-94 | 24 |
| Penetration (mm/10 * 3 sec) | ASTM D217-97 | 170 |
| Cure in depth 24 h (mm/24 h) | | 1.5 |
| Cure in depth 72 h (mm/72 h) | | 1.7 |
| Specify gravity (kg/l) | ASTM D1475-98 | 0.94 |
| Tensile Strength (sheet 2 mm ) (MPa) | ASTM D412-98a | 0.6 |
| Elongation at break (%) | ASTM D412-98a | 1047 |
| 100% modulus (MPa) | ASTM D638-97 | 0.13 |
| Hardness | (Shore A) ASTM D2240-97 | 5 |
| Adhesion Tests | | 7dRT  7H$_2$O |
| | glass | 2  2 |

The invention claimed is:

1. A method of making a diluted chain extended organopolysiloxane containing polymer comprising the steps of:
   (a) reacting a pre-formed polymer with a chain extender reactable with terminal groups of the polymer, said chain extender being selected from the group of
      (v) a dihydrosilane; and
      (vii) a polydialkylsiloxane having a degree of polymerisation of from 2 to 25 and at least one Si—H bond per terminal group; in the presence of a diluent material, a suitable catalyst and optionally an end-blocking agent; and
   (b) where required quenching the chain extension process; wherein the diluent material is substantially retained within the resulting diluted organopolysiloxane containing polymer; and
   wherein the diluent material is selected from one or more of the group of a trialkylsilyl terminated polydialkyl siloxane where each alkyl group
   may be the same or different and comprises from 1 to 6 carbon atoms,
      polyisobutylenes (PIB),
      phosphate esters polyalkylbenzenes, and
      linear and/or branched alkylbenzenes esters of aliphatic monocarboxylic acids;
   or
   wherein the diluent material is selected from one or more of the group comprising
      linear or branched mono unsaturated hydrocarbons; and
      mineral oil fractions comprising linear (n-paraffinic) mineral oils, branched (iso-paraffinic) mineral oils, cyclic (naphthenic) mineral oils, and mixtures thereof.

2. A method in accordance with claim 1 wherein the pre-formed polymer has the general formula $X^1$-A-$X^2$ where $X^1$ and $X^2$ are independently selected from silyl groups containing at least one unsaturated substituent and A is selected from the group of a siloxane polymeric chain, a siloxane copolymeric chain and a siloxane/organic block copolymeric chain and the chain extender comprises two Si—H bonds adapted to be reactable with the unsaturated substituent in $X^1$ and $X^2$.

3. A diluted chain extended organopolysiloxane containing polymer obtained by the method in accordance with claim 1 wherein said diluent material is substantially retained within said diluted chain extended organopolysiloxane containing polymer.

4. A method of making a curable composition capable of cure to an elastomeric body comprising the steps of mixing a diluted chain extended organopolysiloxane containing polymer comprising condensable groups obtained in accordance with claim 1 with a suitable cross-linking agent which is reactive with the diluted chain extended organopolysiloxane containing polymer, a suitable condensation catalyst and optionally filler.

5. A method of making a curable composition capable of cure to an elastomeric body in accordance with claim 4 wherein the cross-linking agent is one or more silanes or siloxanes which contain acyloxy groups, ketoximino groups and the catalyst is a tin catalyst.

6. A method of making a curable composition capable of cure to an elastomeric body in accordance with claim 4 wherein the cross-linking agent is one or more silanes or siloxanes which contain alkoxy groups and alkenyloxy groups and the catalyst is a titanate or zirconate or a chelated titanate or zirconate.

7. A method of making a curable composition capable of cure to an elastomeric body in accordance with claim 4 wherein the filler comprises one or more finely divided, reinforcing fillers selected from the group of high surface area fumed silica, precipitated silica, and calcium carbonate, and/or one or more extending fillers selected from the group of crushed quartz, diatomaceous earth, barium sulphate, iron oxide, titanium dioxide, carbon black, talc, and wollastonite.

8. A composition comprising a diluted chain extended organopolysiloxane containing polymer obtained in accordance with the method of claim 1 wherein said diluent material is substantially retained within the diluted chain extended organopolysiloxane containing polymer and wherein additional diluent comprising a volatile or non-volatile low molecular weight organopolysiloxane containing fluid having a viscosity of between 4 and 100 mPa·s at 25° C. is added to the composition subsequent to completion of polymerisation.

9. A method of making a silicone rubber composition comprising the steps of:
preparing a diluted organopolysiloxane containing polymer in accordance with claim 1 optionally with an alkenyl group, a condensable group, a silyl-hydride or trimethylsilyl containing end-blocker, and a diluent; and
compounding the resulting diluted organopolysiloxane polymer with one or more reinforcing and/or non reinforcing fillers and a curing agent; and optional additives selected from the group of one or more rheology modifiers, pigments, colouring agents, anti-adhesive agents, adhesion promoters, blowing agents, fire retardants and dessicants.

10. A method in accordance with claim 9 wherein the polymer comprises unsaturated groups and the curing agent is a hydrosilylation reaction catalyst in combination with an organohydrogensiloxane.

11. A method in accordance with claim 10 wherein the organohydrogensiloxane comprises from 4-20 silicon atoms per molecule, and has a viscosity of up to about 10 Pa·s at 25° C.

12. A method in accordance with claim 10 wherein the hydrosilylation catalyst is a platinum group metal based catalyst selected from a platinum, rhodium, iridium, palladium or ruthenium catalyst.

13. A method as set forth in claim 1 wherein the end-blocking agent is further defined as providing a functional group to the diluted chain extended organopolysiloxane containing polymer wherein the functional group is selected from the group of —SiOH$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ wherein each R$^a$ is independently a monovalent hydrocarbyl group, wherein each R$^b$ is independently an alkyl group having up to 6 carbon atoms and each R$^d$ is independently an alkyl or alkoxy group in which the alkyl group has up to 6 carbon atoms, wherein each R$^c$ is a divalent hydrocarbon group which is optionally interrupted by one or more siloxane spacers having up to six silicon atoms, and wherein p is 0, 1, or 2.

14. A method as set forth in claim 9 wherein the diluent is further defined as a siloxane-based diluent.

15. A method of making a curable composition capable of cure to an elastomeric body comprising the steps of
(a) reacting a pre-formed polymer with a chain extender reactable with terminal groups of the polymer, said chain extender being selected from the group of
(v) a dihydrosilane; and
(vii) a polydialkylsiloxane having a degree of polymerisation of from 2 to 25 and at least one Si—H bond per terminal group;
in the presence of a diluent material, a suitable catalyst and optionally an end-blocking agent; and
(b) where required, quenching the chain extension process, to make a diluted chain extended organopolysiloxane containing polymer comprising condensable groups wherein the diluent material is substantially retained within the organopolysiloxane containing polymer; and
(c) mixing the organopolysiloxane containing polymer with a suitable cross-linking agent which is reactive with the organopolysiloxane containing polymer, a suitable condensation catalyst and optionally filler.

16. A composition comprising a diluted chain extended organopolysiloxane containing polymer formed by a method comprising the steps of:
(a) reacting a pre-formed polymer with a chain extender reactable with terminal groups of the polymer, said chain extender being selected from the group of
(v) a dihydrosilane; and
(vii) a polydialkylsiloxane having a degree of polymerisation of from 2 to 25 and at least one Si—H bond per terminal group;
in the presence of a diluent material, a suitable catalyst and optionally an end-blocking agent; and
(b) where required quenching the chain extension process; wherein the diluent material is substantially retained within the resulting chain extended organopolysiloxane containing polymer; and
wherein additional diluent comprising a volatile or non-volatile low molecular weight organopolysiloxane containing fluid having a viscosity of between 4 and 100 mPa·s at 25° C. is added to the composition subsequent to completion of polymerisation.

17. A method of making a silicone rubber composition comprising the steps of:
preparing a diluted organopolysiloxane containing polymer optionally with an alkenyl group, a condensable group, a silyl-hydride or trimethylsilyl containing end-blocker, and a diluent, by
(a) reacting a pre-formed polymer with a chain extender reactable with terminal groups of the polymer, the chain extender being selected from the group of
(v) a dihydrosilane; and
(vii) a polydialkylsiloxane having a degree of polymerisation of from 2 to 25 and at least one Si—H bond per terminal group;
in the presence of a diluent material, a suitable catalyst and optionally an end-blocking agent; and
(b) where required quenching the chain extension process;

wherein the diluent material is substantially retained within the resulting diluted organopolysiloxane containing polymer; and compounding the resulting diluted organopolysiloxane polymer with one or more reinforcing and/or non reinforcing fillers and a curing agent; and optional additives selected from the group of one or more rheology modifiers, pigments, colouring agents, anti-adhesive agents, adhesion promoters, blowing agents, fire retardants and dessicants.

* * * * *